United States Patent
Smith

(10) Patent No.: US 9,748,768 B2
(45) Date of Patent: Aug. 29, 2017

(54) PRE-CHARGING AND VOLTAGE SUPPLY SYSTEM FOR A DC-AC INVERTER

(71) Applicant: LG Chem, Ltd., Seoul (KR)

(72) Inventor: Alexander Jeffrey Smith, White Lake, MI (US)

(73) Assignee: LG Chem, Ltd., Seoul (KR)

( * ) Notice: Subject to any disclaimer, the term of this patent is extended or adjusted under 35 U.S.C. 154(b) by 357 days.

(21) Appl. No.: 14/721,125

(22) Filed: May 26, 2015

(65) Prior Publication Data

US 2015/0270711 A1 Sep. 24, 2015

Related U.S. Application Data

(63) Continuation-in-part of application No. 14/221,316, filed on Mar. 21, 2014, now Pat. No. 9,413,184.

(51) Int. Cl.
*H02J 1/00* (2006.01)
*H02J 1/12* (2006.01)
(Continued)

(52) U.S. Cl.
CPC ............. *H02J 1/12* (2013.01); *B60L 11/1868* (2013.01); *B60W 10/00* (2013.01);
(Continued)

(58) Field of Classification Search
None
See application file for complete search history.

(56) References Cited

U.S. PATENT DOCUMENTS 5,408,842 A 4/1995 Goto et al.
6,438,044 B2 8/2002 Fukuda
(Continued)

FOREIGN PATENT DOCUMENTS

JP 767214 A 3/1995
JP 07067214 A 3/1995
(Continued)

OTHER PUBLICATIONS

U.S. Appl. No. 14/105,219, filed Dec. 13, 2013 entitled Pre-Charging System for a Capacitor in a Voltage Inverter for an Electric Motor.
(Continued)

*Primary Examiner* — Thienvu Tran
*Assistant Examiner* — David M Stables
(74) *Attorney, Agent, or Firm* — Buckert Patent & Trademark Law Firm PC; John F. Buckert

(57) ABSTRACT

A pre-charging and voltage supply system for a DC-AC inverter is provided. The system includes a first battery having a first anode and a first cathode, and a second battery having a second anode and a second cathode. The first cathode is electrically isolated from the second cathode. The system includes a contactor coupled in series between the first anode and an electrical node. The system includes a microprocessor that generates a first control signal to induce a DC-DC voltage converter to increase a voltage level applied to the DC-AC inverter. The microprocessor generates a second control signal to induce the contactor transition to a closed position such that a first voltage level is applied to the DC-AC inverter, if the voltage level between the electrical node and the first cathode is greater than a threshold voltage level.

13 Claims, 3 Drawing Sheets

(51) Int. Cl.
*B60L 11/18* (2006.01)
*B60W 10/00* (2006.01)
*H02J 7/00* (2006.01)

(52) U.S. Cl.
CPC ..... *B60L 2210/14* (2013.01); *B60L 2240/527* (2013.01); *B60L 2240/547* (2013.01); *H02J 7/0063* (2013.01); *Y02T 10/7005* (2013.01); *Y02T 10/7066* (2013.01); *Y02T 10/7225* (2013.01); *Y10T 307/549* (2015.04)

(56) References Cited

U.S. PATENT DOCUMENTS

| | | | |
|---|---|---|---|
| 6,488,107 B1 * | 12/2002 | Ochiai | B60K 6/48 180/65.25 |
| 6,654,262 B2 | 11/2003 | Hussein et al. | |
| 6,768,621 B2 | 7/2004 | Arnet et al. | |
| 7,400,116 B2 | 7/2008 | Kato et al. | |
| 7,688,023 B2 | 3/2010 | Yoon et al. | |
| 8,456,878 B2 | 6/2013 | Min | |
| 2003/0029654 A1 | 2/2003 | Shimane et al. | |
| 2005/0219195 A1 | 10/2005 | Yano et al. | |
| 2006/0076934 A1 | 4/2006 | Ogata et al. | |
| 2007/0164693 A1 | 7/2007 | King et al. | |
| 2007/0264547 A1 | 11/2007 | Ojima et al. | |
| 2009/0108674 A1 | 4/2009 | Ozaki et al. | |
| 2010/0090525 A1 * | 4/2010 | King | B60L 11/1868 307/10.1 |
| 2010/0225258 A1 | 9/2010 | Namuduri et al. | |
| 2010/0277845 A1 | 11/2010 | Park et al. | |
| 2011/0049977 A1 | 3/2011 | Onnerud et al. | |
| 2012/0002332 A1 | 1/2012 | Riley | |
| 2013/0121051 A1 | 5/2013 | Weiss et al. | |
| 2013/0229186 A1 | 9/2013 | Shiraishi et al. | |
| 2013/0278055 A1 | 10/2013 | Herbig et al. | |
| 2014/0001835 A1 | 1/2014 | Basheer | |
| 2015/0084404 A1 | 3/2015 | Hashim et al. | |
| 2015/0270735 A1 | 9/2015 | Smith | |

FOREIGN PATENT DOCUMENTS

| | | |
|---|---|---|
| JP | 09284912 A | 10/1997 |
| JP | 2003061209 | 2/2003 |
| JP | 2006136161 A | 5/2006 |
| JP | 2007295699 | 11/2007 |
| JP | 2007305372 A | 11/2007 |
| JP | 2008011639 A | 1/2008 |
| JP | 2009051242 A | 3/2009 |
| JP | 2010057290 A | 3/2010 |
| KR | 1020090075910 | 7/2009 |
| KR | 20100104079 A | 9/2010 |
| KR | 1020120002483 | 1/2012 |
| KR | 1020130022763 A | 3/2013 |
| KR | 20140040701 | 4/2014 |
| KR | 20140040791 | 4/2014 |

OTHER PUBLICATIONS

U.S. Appl. No. 14/135,899, filed Dec. 20, 2013 entitled Pre-Charging System for a Capacitor in an Electric Motor Voltage Inverter.
U.S. Appl. No. 14/221,316, filed Mar. 21, 2014 entitled Pre-Charging and Voltage Supply System for a DC-AC Inverter.
U.S. Appl. No. 14/258,113, filed Apr. 22, 2014 entitled Voltage Supply System and Method for Disabling Operation of a DC-DC Voltage Converter.
U.S. Appl. No. 61/910,497, filed Dec. 2, 2013 entitled Pre-Charging System for a Capacitor in a Voltage Inverter for an Electric Motor.

* cited by examiner

PRE-CHARGING AND VOLTAGE SUPPLY SYSTEM FOR A DC-AC INVERTER

CROSS-REFERENCE TO RELATED APPLICATIONS

This application is a continuation-in-part of U.S. patent application Ser. No. 14/221,316 filed on Mar. 21, 2014, the entire contents of which are hereby incorporated by reference herein.

BACKGROUND

The inventor herein has recognized a need for an improved pre-charging and voltage supply system and a method for pre-charging and supplying voltages to a DC-AC inverter, which eliminates a pre-charging contactor and a pre-charging resistor.

SUMMARY

A pre-charging and voltage supply system for a DC-AC inverter in accordance with an exemplary embodiment is provided. The pre-charging and voltage supply system includes a first battery having a first anode and a first cathode. The first cathode is electrically coupled to a first isolated system ground. The first battery is adapted to generate a first voltage level between the first anode and the first cathode. The pre-charging and voltage supply system further includes a contactor electrically coupled in series with and between the first anode and an electrical node. The pre-charging and voltage supply system further includes a first voltage sensor electrically coupled between and to the electrical node and the first cathode. The first voltage sensor is adapted to generate a first voltage signal indicative of a voltage level between the electrical node and the first cathode. The pre-charging and voltage supply system further includes a DC-DC voltage converter electrically coupled between and to the electrical node and the first cathode. The pre-charging and voltage supply system further includes a second battery having a second anode and a second cathode. The second cathode is electrically coupled to a second isolated system ground. The second isolated system ground is electrically isolated from the first isolated system ground. The second anode is electrically coupled to the DC-DC voltage converter. The second battery is adapted to generate a second voltage level between the second anode and the second cathode. The second voltage level is less than the first voltage level. The pre-charging and voltage supply system further includes a microprocessor operably coupled to the first voltage sensor and the DC-DC voltage converter. The microprocessor is programmed to generate a first control signal to induce the DC-DC voltage converter to increase a voltage level applied to the DC-AC inverter, utilizing the second voltage level from the second battery. The microprocessor is further programmed to generate a second control signal to induce the contactor to transition a contact from an open operational position to a closed operational position such that the first voltage level from the first battery is applied to the DC-AC inverter, if the voltage level between the electrical node and the first cathode is greater than a threshold voltage level.

A method for pre-charging and supplying voltages to a DC-AC inverter in accordance with another exemplary embodiment is provided. The method includes providing a pre-charging and voltage supply system having a first battery, a contactor, a first voltage sensor, a DC-DC voltage converter, a second battery, and a microprocessor. The first battery has a first anode and a first cathode. The first cathode is electrically coupled to a first isolated system ground. The contactor is electrically coupled in series with and between the first anode and an electrical node. The first voltage sensor is electrically coupled between and to the electrical node and the first cathode. The DC-DC voltage converter is electrically coupled between and to the electrical node and the first cathode. The second battery has a second anode and a second cathode. The second cathode is electrically coupled to a second isolated system ground. The second isolated system ground is electrically isolated from the first isolated system ground. The second anode is electrically coupled to the DC-DC voltage converter. The DC-AC inverter is electrically coupled between and to the electrical node and the first cathode. The microprocessor is operably coupled to the first voltage sensor and the DC-DC voltage converter. The method includes generating a first voltage level between the first anode and the first cathode of the first battery. The method further includes generating a second voltage level between the second anode and the second cathode of the second battery. The second voltage level is less than the first voltage level. The method further includes generating a first control signal from the microprocessor to induce the DC-DC voltage converter to increase a voltage level applied to the DC-AC inverter, utilizing the second voltage level. The method further includes generating a first voltage signal indicative of the voltage level between the electrical node and the first cathode, utilizing the first voltage sensor, which is received by the microprocessor. The method further includes generating a second control signal to induce the contactor to transition a contact from an open operational position to a closed operational position utilizing the microprocessor such that the first voltage level from the first battery is applied to the DC-AC inverter, if the voltage level between the electrical node and the first cathode is greater than the threshold voltage level.

DETAILED DESCRIPTION

Figure 1:
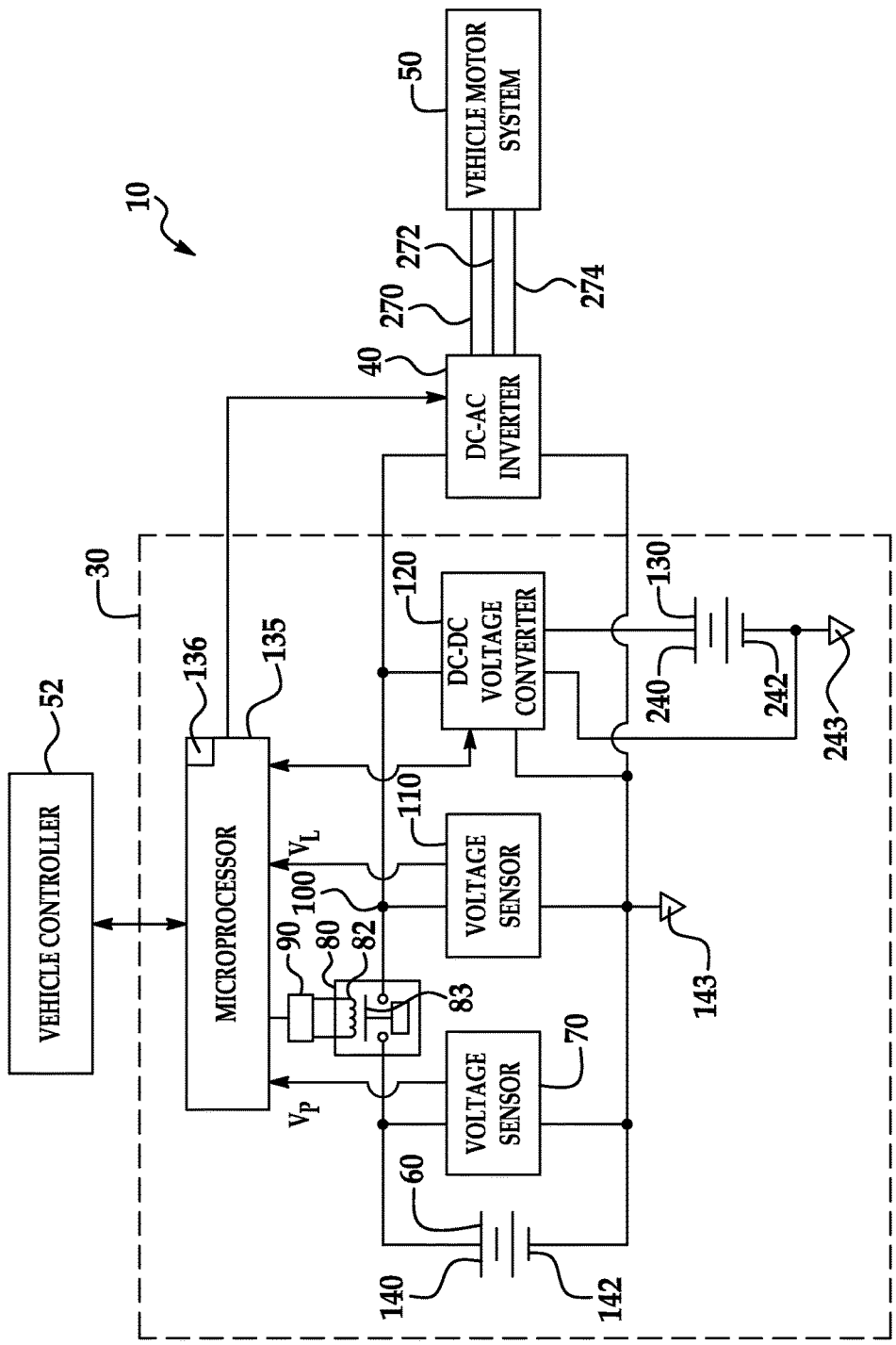
FIG. 1 is a schematic of an electric vehicle having a pre-charging and voltage supply system in accordance with an exemplary embodiment, an AC-DC inverter, and a vehicle motor system.

Referring to FIG. 1, an electric vehicle 10 having a pre-charging and voltage supply system 30 in accordance with an exemplary embodiment, a DC-AC inverter 40, a vehicle motor system 50, and a vehicle controller 52 is illustrated. An advantage of the pre-charging and voltage supply system 30 is that the system 30 utilizes a DC-DC voltage converter 120 and a second battery 130 to pre-charge capacitors in the DC-AC inverter 40, instead of using an additional pre-charging contactor and an additional pre-charging resistor.

The pre-charging and voltage supply system 30 is provided to pre-charge at least one capacitor in the DC-AC inverter 40 to limit an amount of electrical inrush current from the first battery 60 into the DC-AC inverter 40 when the contactor 80 has a closed operational position. After the pre-charging operation, the system 30 provides an operational voltage level from the first battery 60 to the DC-AC inverter 40, and sends a control signal to the DC-AC inverter 40 to induce the DC-AC inverter 40 to output AC voltages corresponding to a desired torque amount.

The pre-charging and voltage supply system 30 includes the first battery 60, a voltage sensor 70, the contactor 80, a contactor driver 90, an electrical node 100, a voltage sensor 110, the DC-DC voltage converter 120, and a second battery 130.

The first battery 60 has an anode 140 and a cathode 142. The cathode 142 is electrically coupled to a first isolated system ground 143. The first battery 60 is adapted to generate a first voltage level between the anode 140 and the cathode 142. In an exemplary embodiment, the first battery 60 comprises a lithium-ion battery pack having a plurality of battery cells electrically coupled together therein. Of course, in an alternative embodiment the first battery 60 could comprise another type of battery such as a nickel-cadmium battery a nickel-metal-hydride battery, or a lead acid battery for example. Further, in an exemplary embodiment, the first battery 60 outputs a voltage in a range of 60-600 voltage DC (VDC). Of course, in an alternative embodiment, the first battery 60 could output another voltage level.

The voltage sensor 70 is the electrically coupled in parallel with the first battery 60, and further electrically coupled to the anode 140 and the cathode 142 of the first battery 60. The voltage sensor 70 is adapted to generate a voltage signal ($V_P$) indicative of a voltage level output by the first battery 60. The microprocessor 135 receives the voltage signal ($V_P$) from the voltage sensor 70 and determines the voltage level output by the first battery 60 based on the voltage signal ($V_P$).

The contactor 80 is electrically coupled in series with and between the first anode 60 and the electrical node 100. The contactor 80 includes a contactor coil 82 and a contact 83. When the microprocessor 135 generates a control signal that is received by the contactor driver 90, the contactor driver 90 energizes the contactor coil 82 which moves the contact 83 to a closed operational position. Alternately, when the microprocessor 135 stops generating the control signal, the contactor driver 90 de-energizes the contactor coil 82 which moves the contact 83 to an open operational position.

The voltage sensor 110 is electrically coupled between and to the electrical node 100 and the cathode 142. The voltage sensor 110 is adapted to generate a voltage signal ($V_L$) indicative of a voltage level between the electrical node 100 and the cathode 142. The microprocessor 135 receives the voltage signal ($V_L$) from the voltage sensor 110 and determines the voltage level voltage level between the electrical node 100 and the cathode 142 based on the voltage signal ($V_L$).

The DC-DC voltage converter 120 is electrically coupled between and to the electrical node 100 and the cathode 142 wherein the cathode 142 is electrically coupled to the first isolated system ground 143. The DC-DC voltage converter 120 is further electrically coupled to the anode 240 and the cathode 242 of the battery 130. The cathode 242 is further electrically coupled to the second isolated system ground 243. The DC-DC voltage converter 120 is provided to output a voltage level between the electrical node 100 and first isolated system ground 143 (and to the DC-AC inverter 40) that is greater than a voltage level output by the battery 130, utilizing the voltage level output by the battery 130, to pre-charge at least one capacitor in the DC-AC inverter 40. During operation, the microprocessor 135 generates a control signal is received by the DC-DC voltage converter 120, and in response the DC-DC voltage converter 120 outputs a predetermined voltage level to the DC-AC inverter 40 based on the control signal.

The second battery 130 has an anode 240 and a cathode 242. The cathode 242 is electrically coupled to the second isolated system ground 243. The second isolated system ground 243 is electrically isolated from the first isolated system ground 143. The anode 240 is electrically coupled to the DC-DC voltage converter 120. The second battery 130 is adapted to generate a voltage level between the anode 240 and the cathode 242 which is less than a voltage level output by the battery 60. In an exemplary embodiment, the second battery 130 is a lead acid battery. Of course, in an alternative embodiment the second battery 130 could comprise another type of battery such as a nickel-cadmium battery, a nickel-metal-hydride battery, or a lithium-ion battery for example. Further, in an exemplary embodiment, the second battery 130 outputs a voltage in a range of 12-60 VDC. For example, the second battery 130 could output 12 VDC or 24 VDC. Of course, in an alternative embodiment, the second battery 130 could output another voltage level.

The DC-AC inverter 40 is electrically coupled between and to the electrical node 100 and the cathode 142 of the first battery 60. Further, the DC-AC inverter 40 is electrically coupled to the vehicle motor system 50 via the electrical lines 270, 272, 274. Still further, the DC-AC inverter 40 operably communicates with the microprocessor 135. During a pre-charging operation, when the contact 83 has an open operational position, the DC-AC inverter 40 is adapted to receive a voltage level from the DC-DC voltage converter 120 which pre-charges at least one capacitor in the DC-AC inverter 40 in order to reduce an electrical inrush current into the DC-AC inverter 40 when the contact 83 transitions to a closed operational position. Thereafter, when the contact 83 has the closed operational position, the DC-AC inverter 40 receives a voltage level from the first battery 60. Further, the microprocessor 135 generates a control signal to induce the DC-AC inverter 40 to output AC voltages on the electrical lines 270, 272, 274 to induce the vehicle motor system 50 to output a desired torque amount.

In an exemplary embodiment, the vehicle motor system 50 is an electric motor in at least one of: a traction motor drivetrain, an electric turbocharger, an electric supercharger, an electric power steering system, an electric air conditioner compressor, and an electric air compressor. In another exemplary embodiment, the vehicle motor system 50 could be replaced by a battery charger which is electrically coupled to the DC-AC inverter 40.

Further, in an alternative embodiment, the DC-DC voltage converter 120 could be electrically coupled to and supplying a DC output voltage to at least one of: a traction motor drivetrain, an electric turbocharger, an electric supercharger, an electric power steering system, an electric air conditioner compressor, an electric air compressor, an electric coolant heater, an electric cabin heater, and a DC fast charging device.

The microprocessor 135 is operably coupled to the voltage sensor 70, the voltage sensor 110, the DC-DC voltage converter 120, and the DC-AC inverter 40. The microprocessor 135 operably communicates with a memory device 136 and stores data and operational instructions in the memory device 136. The microprocessor 135 is programmed to perform operational steps which will be described in greater detail below.

Figure 2:
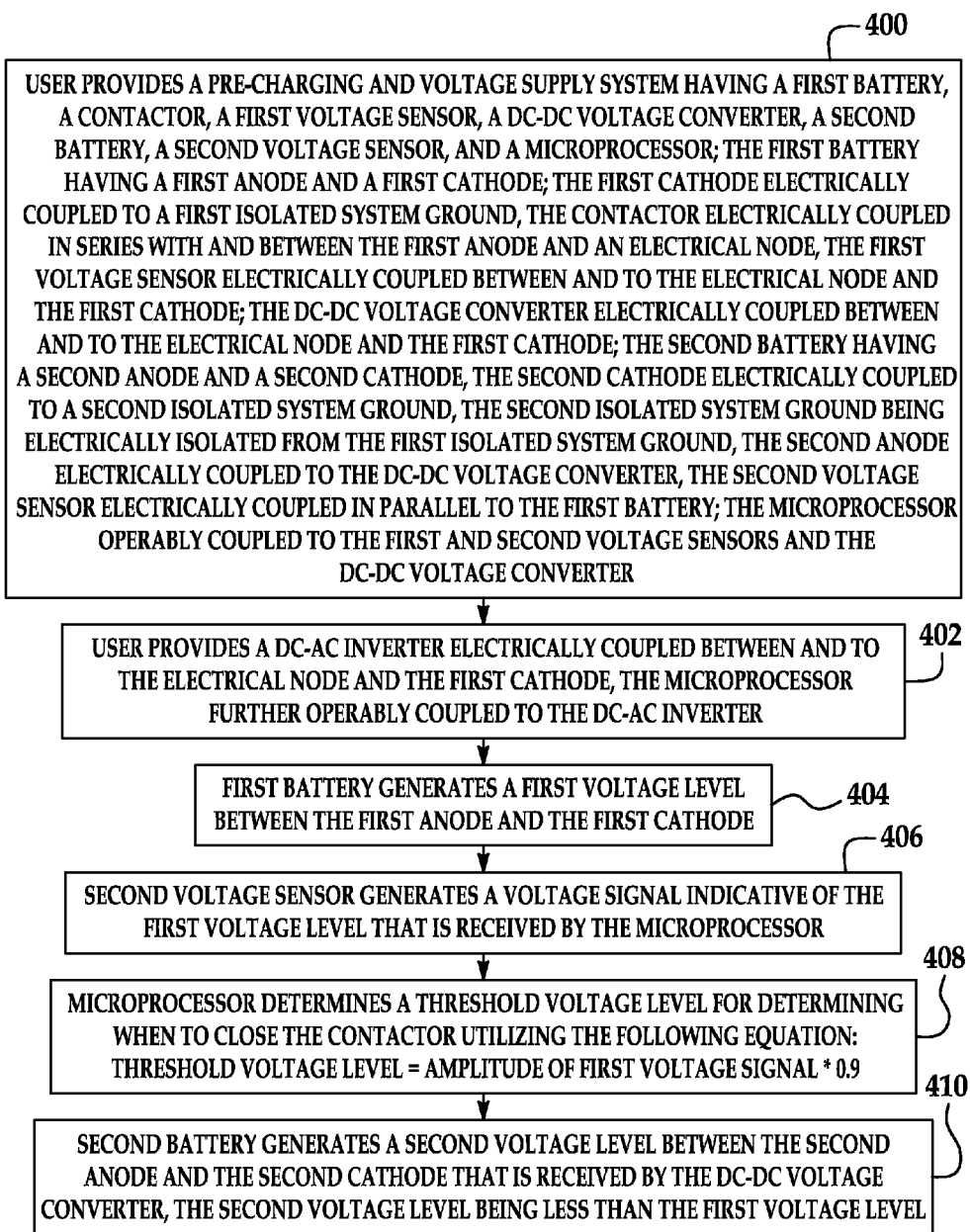
FIGS. 2-3 are flowcharts of a method for pre-charging and supplying voltages to a DC-AC inverter in accordance with another exemplary embodiment.
Figure 3:
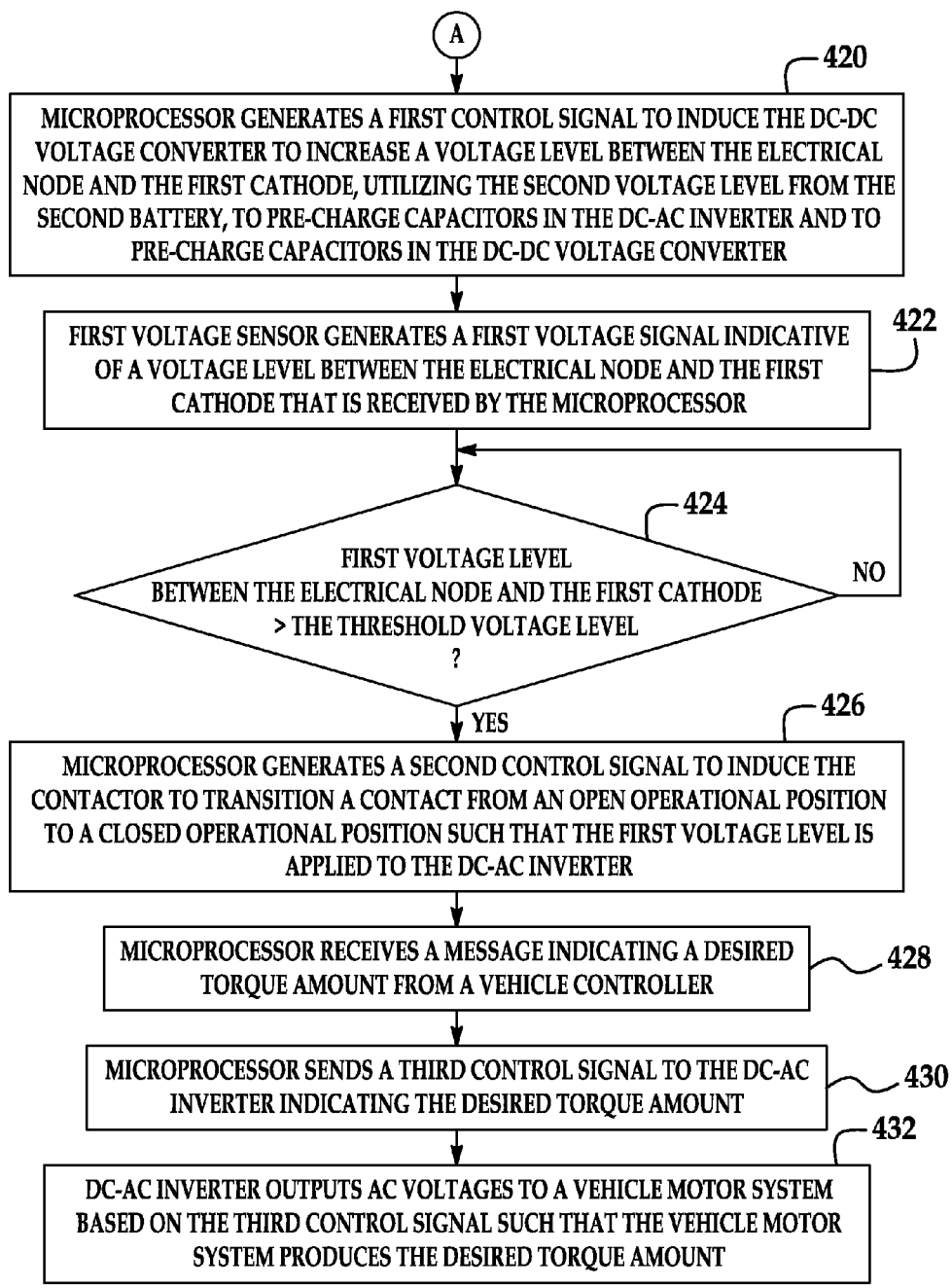

Referring to FIGS. 1-3, a flowchart of a method for pre-charging and supplying voltages to a DC-AC inverter in accordance with another exemplary embodiment will now be described.

At step 400, a user provides the pre-charging and voltage supply system 30 having the first battery 60, the contactor 80, the voltage sensor 110, the DC-DC voltage converter 120, the second battery 130, the voltage sensor 70, and the microprocessor 135. The first battery 60 has an anode 140 and a cathode 142. The cathode 142 is electrically coupled to the first isolated system ground 143. The contactor 80 is electrically coupled in series with and between the anode 140 and an electrical node 100. The voltage sensor 110 is electrically coupled between and to the electrical node 100 and the cathode 142. The DC-DC voltage converter 120 is electrically coupled between and to the electrical node 100 and the cathode 142. The second battery 130 has an anode 240 and a cathode 242. The cathode 242 is electrically coupled to a second isolated system ground 243. The second isolated system ground 243 is electrically isolated from the first isolated system ground 143. The anode 240 is electrically coupled to the DC-DC voltage converter 120, and the cathode 242 is electrically coupled to the DC-DC voltage converter 120. The voltage sensor 70 is electrically coupled in parallel to the first battery 60. The microprocessor 135 is operably coupled to the voltage sensors 70, 110 and the DC-DC voltage converter 120. After step 400, the method advances to step 402.

At step 402, the user provides the DC-AC inverter 40 electrically coupled between and to the electrical node 100 and the cathode 142. The microprocessor 135 is further operably coupled to the DC-AC inverter 40. After step 402, the method advances to step 404.

At step 404, the first battery 60 generates a first voltage level between the anode 140 and the cathode 142. After step 404, the method advances to step 406.

At step 406, the voltage sensor 70 generates a voltage signal indicative of the first voltage level that is received by the microprocessor 135. After step 406, the method advances to step 408.

At step 408, the microprocessor 135 determines a threshold voltage level for determining when to close the contactor utilizing the following equation: threshold voltage level=amplitude of first voltage signal*0.9. After step 408, the method advances to step 410.

At step 410, the second battery 130 generates a second voltage level between the anode 240 and the cathode 242 that is received by the DC-DC voltage converter 120. The second voltage level is less than the first voltage level. After step 410, the method advances to step 420.

At step 420, the microprocessor 135 generates a first control signal to induce the DC-DC voltage converter 120 to increase a voltage level between the electrical node 100 and the cathode 142, utilizing the second voltage level from the second battery 130 to charge capacitors in the DC-AC inverter 40 and to charge capacitors in the DC-DC converter 120. After step 420, the method advances to step 422.

At step 422, the voltage sensor 110 generates a first voltage signal indicative of a voltage level between the electrical node 100 and the cathode 142 that is received by the microprocessor 135. After step 422, the method advances to step 424.

At step 424, the microprocessor 135 makes a determination as to whether the voltage level between the electrical node 100 and the cathode 142 is greater than the threshold voltage level. The value of step 424 equals "yes", the method advances to step 426. Otherwise, the method returns to step 424.

At step 426, the microprocessor 135 generates a second control signal to induce the contactor 80 to transition the contact 83 from an open operational position to a closed operational position such that the first voltage level is applied to the DC-AC inverter 40. After step 426, the method advances to step 428.

At step 428, the microprocessor 135 receives a message indicating a desired torque amount from a vehicle controller 52. After step 428, the method advances to step 430.

At step 430, the microprocessor 135 sends a third control signal to the DC-AC inverter 40 indicating the desired torque amount. After step 430, the method advances to step 432.

At step 432, the DC-AC inverter 40 outputs AC voltages to the vehicle motor system 50 based on the third control signal such that the vehicle motor system 50 produces the desired torque amount.

The above-described method can be at least partially embodied in the form of one or more memory devices or computer readable media having computer-executable instructions for practicing the methods. The memory devices can comprise one or more of the following: hard drives, RAM memory, flash memory, and other computer-readable media known to those skilled in the art; wherein, when the computer-executable instructions are loaded into and executed by one or more computers or microprocessors, the one or more computers or microprocessors become an apparatus programmed to practice the associated steps of the method.

The pre-charging and voltage supply system and the method described herein provide a substantial advantage over other systems and methods. In particular, the pre-charging and voltage supply system and method provide a technical effect of utilizing a DC-DC voltage converter and a battery to pre-charge capacitors in the DC-AC inverter to reduce an amount of electrical inrush current into the DC-AC inverter when a main contactor has a closed operational position.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A pre-charging and voltage supply system for a DC-AC inverter, comprising:
a first battery having a first anode and a first cathode, the first battery adapted to generate a first voltage level between the first anode and the first cathode, the first cathode electrically coupled to a first isolated system ground;
a contactor electrically coupled in series with and between the first anode and an electrical node;
a first voltage sensor electrically coupled between and to the electrical node and the first cathode, the first voltage sensor adapted to generate a first voltage signal indicative of a voltage level between the electrical node and the first cathode;
a DC-DC voltage converter electrically coupled between and to the electrical node and the first cathode;
a second battery having a second anode and a second cathode, the second anode electrically coupled to the DC-DC voltage converter; the second cathode electrically coupled to a second isolated system ground, the second isolated system ground being electrically isolated from the first isolated system ground; the second battery adapted to generate a second voltage level between the second anode and the second cathode, the second voltage level being less than the first voltage level;
a microprocessor operably coupled to the first voltage sensor and the DC-DC voltage converter, the microprocessor programmed to generate a first control signal to induce the DC-DC voltage converter to increase a voltage level applied to the DC-AC inverter, utilizing the second voltage level from the second battery; and
the microprocessor further programmed to generate a second control signal to induce the contactor to transition a contact from an open operational position to a closed operational position such that the first voltage level from the first battery is applied to the DC-AC inverter, if the voltage level between the electrical node and the first cathode is greater than a threshold voltage level.

2. The pre-charging and voltage supply system of claim 1, wherein:
the microprocessor further programmed to determine the voltage level between the electrical node and the first cathode based on the first voltage signal from the first voltage sensor; and
the microprocessor further programmed to determine if the voltage level between the electrical node and the first cathode is greater than the threshold voltage level.

3. The pre-charging and voltage supply system of claim 1, further comprising:
a second voltage sensor electrically coupled in parallel with the first battery, the second voltage sensor adapted to generate a second voltage signal indicative of the first voltage level; and
the microprocessor further programmed to determine the threshold voltage level based on the first voltage signal.

4. The pre-charging and voltage supply system of claim 3, wherein the microprocessor further programmed to determine the threshold voltage level by multiplying the first voltage level by a predetermined value.

5. The pre-charging and voltage supply system of claim 1, wherein the second voltage level is substantially equal to one of 12 VDC and 24 VDC.

6. The pre-charging and voltage supply system of claim 1, wherein:
the microprocessor further programmed to receive a message indicating a desired torque amount; and
the microprocessor further programmed to send a third control signal to the DC-AC inverter indicating the desired torque amount.

7. The pre-charging and voltage supply system of claim 1, wherein the DC-AC inverter is electrically coupled between and to the electrical node and the first cathode of the first battery.

8. A method for pre-charging and supplying voltages to a DC-AC inverter, comprising:

providing a pre-charging and voltage supply system having a first battery, a contactor, a first voltage sensor, a DC-DC voltage converter, a second battery, and a microprocessor; the first battery having a first anode and a first cathode; the first cathode electrically coupled to a first isolated system ground, the contactor electrically coupled in series with and between the first anode and an electrical node; the first voltage sensor electrically coupled between and to the electrical node and the first cathode; the DC-DC voltage converter electrically coupled between and to the electrical node and the first cathode; the second battery having a second anode and a second cathode, the second cathode electrically coupled to a second isolated system ground, the second isolated system ground being electrically isolated from the first isolated system ground, the second anode electrically coupled to the DC-DC voltage converter; the DC-AC inverter electrically coupled between and to the electrical node and the first cathode; the microprocessor operably coupled to the first voltage sensor and the DC-DC voltage converter;
generating a first voltage level between the first anode and the first cathode of the first battery;
generating a second voltage level between the second anode and the second cathode of the second battery, the second voltage level being less than the first voltage level;
generating a first control signal from the microprocessor to induce the DC-DC voltage converter to increase a voltage level applied to the DC-AC inverter, utilizing the second voltage level;
generating a first voltage signal indicative of the voltage level between the electrical node and the first cathode, utilizing the first voltage sensor, that is received by the microprocessor;
generating a second control signal to induce the contactor to transition a contact from an open operational position to a closed operational position utilizing the microprocessor such that the first voltage level from the first battery is applied to the DC-AC inverter, if the voltage level between the electrical node and the first cathode is greater than the threshold voltage level.

9. The method of claim 8, further comprising:
determining the voltage level between the electrical node and the first cathode based on the first voltage signal, utilizing the microprocessor; and
determining if the voltage level between the electrical node and the first cathode is greater than the threshold voltage level, utilizing the microprocessor.

10. The method of claim 8, wherein the pre-charging and voltage supply system further includes a second voltage sensor electrically coupled in parallel with the first battery, the method further comprising:
generating a second voltage signal indicative of the first voltage level utilizing the second voltage sensor; and
determining the threshold voltage level based on the first voltage signal utilizing the microprocessor.

11. The method of claim 10, further comprising determining the threshold voltage level by multiplying the first voltage level by a predetermined value, utilizing the microprocessor.

12. The method of claim 8, wherein the second voltage level is substantially equal to one of 12 VDC and 24 VDC.

13. The method of claim 8, further comprising:
receiving a message indicating a desired torque amount by the microprocessor; and sending a third control signal to the DC-AC inverter indicating the desired torque amount.

\* \* \* \* \*